Patented Nov. 26, 1929

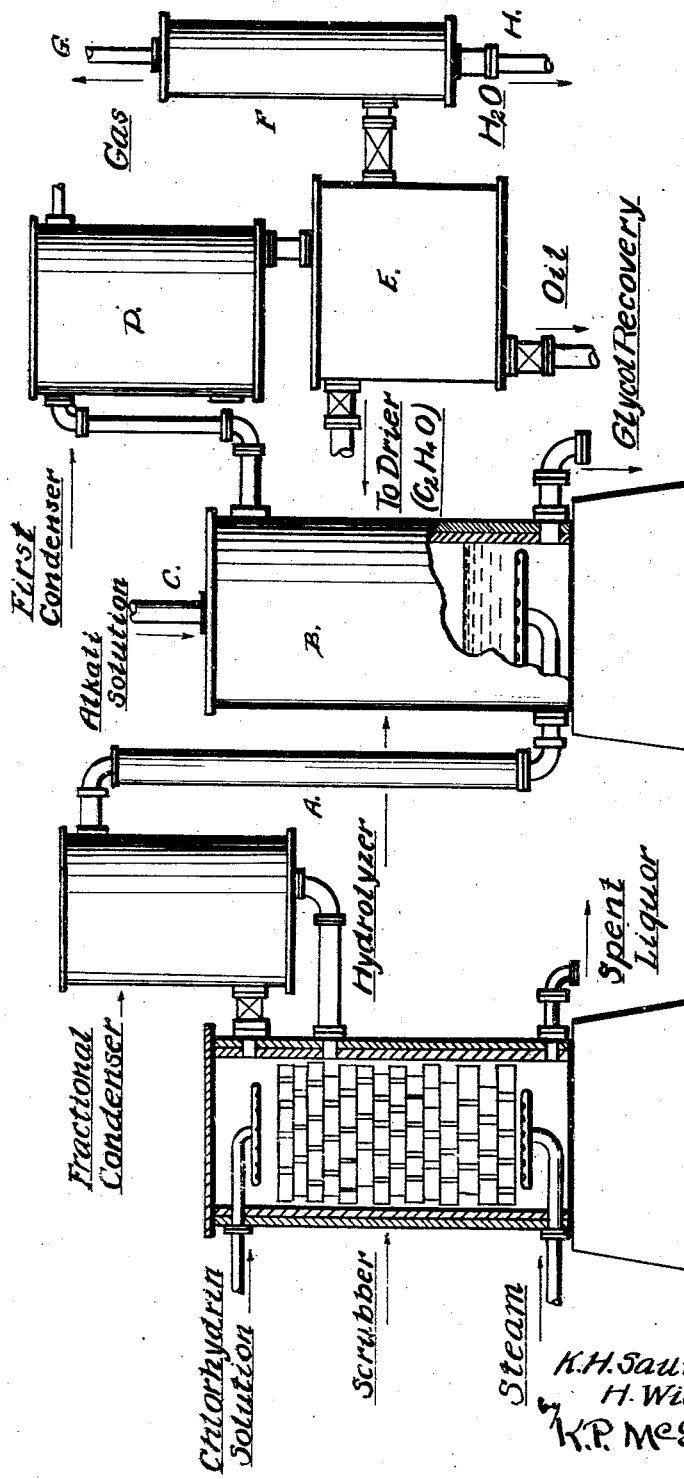

1,737,545

UNITED STATES PATENT OFFICE

KENNETH HERBERT SAUNDERS, OF BLACKLEY, MANCHESTER, AND HARRY WIGNALL, OF HUDDERSFIELD, ENGLAND, ASSIGNORS TO BRITISH DYESTUFFS CORPORATION LIMITED, OF BLACKLEY, MANCHESTER, ENGLAND

MANUFACTURE OF ETHYLENE GLYCOL

Application filed February 2, 1928, Serial No. 251,459, and in Great Britain February 8, 1927.

In the usual methods of manufacturing ethylene glycol and its anhydride, ethylene oxide, the initial material is a crude weak solution of ethylene chlorohydrin made from ethylene with the aid of chlorin and water or HOCl. This solution is distilled to produce stronger purer liquid distillates and these distillates are alkalized to produce ethylene glycol or oxide as the case may be. The operation is not a continuous one. The object of the present invention is to make concentration and alkalization continuous, while it is a special feature of the present process that loss of heat is avoided by omitting the condensation of the vapour of the ethylene chlorohydrin incident to distillation.

According to this invention we may obtain the glycol either in the form of ethylene glycol itself, or in the form of its anhydride ethylene oxide, as described hereafter.

By "ethylene glycol" in this specification is meant both the glycol as such and in the form of its anhydride.

The mode of action is as follows:

At the bottom of a scrubber tower, lagged and filled with suitable packing, a steady stream of steam enters and ascends against a descending flow of crude weak chlorohydrin solution. The amount of this steam is adjusted so that it is exactly sufficient to volatilize and to carry upwards the ethylene chlorohydrin contained in the stream of crude solution admitted at the top. It is important that the rate of the flow of the solution should be accurately controlled. The current of steam laden with ethylene chlorohydrin leaving the top of the packed tower, traverses a fractionating column and passes away at the head thereof, carrying 95 per cent of the ethylene chlorohydrin originally contained in the crude solution. When the counter current tower is efficiently worked the constitution of the vapours at the head of the fractionating column is such that, if condensed as a whole, a 40 per cent aqueous solution of ethylene chlorohydrin would be obtained, i. e. the constitution approximates to that of the ethylene chlorohydrin constant boiling solution. The spent liquor and condensed steam flow away by the trap at the bottom of the counter current scrubbing tower.

In the accompanying illustration we have shown diagrammatically a plant suitable in the operation of the present invention, the showing being generally in elevation with certain parts in vertical section.

As so far described, the output of the system is ethylene chlorohydrin vapors of suitable concentration. In the present invention, these vapors are submitted to alkalization without intermediate condensation to liquid.

The ethylene chlorohydrin vapour, together with any volatile impurities coming from the crude solution, passes down a well-lagged pipe A to the bottom of a second packed tower B (packing not shown), which it enters by bubbling through the hot liquid contained at the bottom. This liquid is kept hot either by external burners or other suitable means. The admixed ethylene chlorohydrin vapours and steam ascending this tower meet a downflowing solution of sodium carbonate, if the ethylene glycol as such is to be obtained, or of caustic alkali if it is required in the form of its anhydride, admitted in the correct proportion through the inlet tube C. The The ethylene chlorohydrin is hydrolyzed to the glycol with concomitant production of salt (NaCl), whilst steam, carbon dioxide and volatile unhydrolyzable impurities pass away to a first condenser D; the ethylene glycol dissolves in the salt solution and is carried down to the bottom of the tower. Proper regulation of the supply of heat to the bottom of the tower enables the glycol solution, which flows away by the trap to the glycol recovery system (not shown), to be as concentrated as desired up to the crystallization point of its saline contents. The glycol solution flows from the trap direct to the desalter or other standard concentration plant.

The water and oily impurities, condensed in D, are collected in a catch-pot E where they form two layers. The oily portion is usually heavier than water because of the presence of chlorohydrin and underlies the aqueous portion of the condensate. The oil is drawn off at the bottom and the water overflows at the top into the gas-separator F. Carbon dioxide passes away by the pipe G, and water overflows to waste at the trap H.

When the glycol is obtained in the form of its anhydride by treating the ascending vapors in B with a solution of caustic alkali introduced at C, the gaseous ethylene oxide ($C_2H_4O$) passing away at the top of the tower is dried and collected in the usual manner.

What we claim and desire to secure by Letters Patent is:—

1. In the continuous production of ethylene derivatives from crude weak solutions of ethylene chlorohydrin the process which comprises steam distilling such a solution to produce hot concentrated vapors of the chlorohydrin and passing such hot vapors in countercurrent to a flow of an alkaline solution.

2. In the continuous production of ethylene derivatives from crude weak solutions of ethylene chlorohydrin the process which comprises steam distilling such a solution to produce hot concentrated vapors of the chlorohydrin and passing such hot vapors in countercurrent to a flow of caustic alkali solution.

In testimony whereof we affix our signatures.

KENNETH HERBERT SAUNDERS.
HARRY WIGNALL.